United States Patent
Schlaps

(10) Patent No.: US 9,434,348 B2
(45) Date of Patent: Sep. 6, 2016

(54) SEATBELT LATCH CIRCUIT

(71) Applicant: TRW Vehicle Safety Systems Inc., Washington, MI (US)

(72) Inventor: Edgar H. Schlaps, Washington, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 156 days.

(21) Appl. No.: 14/165,654

(22) Filed: Jan. 28, 2014

(65) Prior Publication Data

US 2014/0266663 A1 Sep. 18, 2014

Related U.S. Application Data

(60) Provisional application No. 61/790,397, filed on Mar. 15, 2013.

(51) Int. Cl.
*B60Q 1/00* (2006.01)
*B60R 22/48* (2006.01)
*G08G 1/00* (2006.01)
*B60R 1/00* (2006.01)

(52) U.S. Cl.
CPC .................. *B60R 22/48* (2013.01); *B60R 1/00* (2013.01); *B60R 2022/4816* (2013.01); *G08G 1/00* (2013.01)

(58) Field of Classification Search
CPC .................................. B60R 1/00; G08G 1/00
See application file for complete search history.

(56) References Cited

U.S. PATENT DOCUMENTS

| 4,972,052 A * | 11/1990 | Hawranek | G01B 7/003 200/11 R |
| 5,008,595 A * | 4/1991 | Kazar | H05B 33/0803 315/178 |
| 5,892,436 A * | 4/1999 | Blackburn | A44B 11/2565 180/268 |
| 2003/0150283 A1* | 8/2003 | Stanley | G01L 5/103 73/862.391 |
| 2010/0283593 A1* | 11/2010 | Miller | B60C 23/0408 340/447 |
| 2014/0239853 A1* | 8/2014 | Woodham | F21V 33/0064 315/362 |

* cited by examiner

*Primary Examiner* — Shirley Lu
(74) *Attorney, Agent, or Firm* — Tarolli, Sundheim, Covell & Tummino LLP

(57) ABSTRACT

A seatbelt latch circuit can include an illumination source configured to illuminate a seatbelt latch in response to a signal. The seatbelt latch circuit can also include a status sensor configured to output a first current if the seatbelt latch is in a removed state, output a second current if the seatbelt latch is in an inserted state and output a third current if the seatbelt latch has a fault. The seatbelt latch circuit communicates with a vehicle electrical system through only two conductors.

18 Claims, 7 Drawing Sheets

SEATBELT LATCH CIRCUIT

RELATED APPLICATIONS

This application claims the benefit of the earlier filing date of U.S. Provisional Application Ser. No. 61/790,397, filed Mar. 15, 2013.

TECHNICAL FIELD

The present application relates to a seat belt latch circuit. More particularly, the present application relates to a seatbelt latch circuit that communicates with a vehicle electrical system.

BACKGROUND OF THE INVENTION

A seat belt system for restraining a vehicle occupant typically includes seat belt webbing, a seat belt locking tongue on the webbing, and a seat belt buckle. The tongue on the webbing is inserted and locked in the buckle to secure the webbing about a vehicle occupant. Such a seat belt system may also include an illuminating structure for illuminating the buckle to help the vehicle occupant locate the buckle.

SUMMARY

The present invention relates to a seatbelt latch circuit including an illumination source configured to illuminate a seatbelt latch in response to a signal. The seatbelt latch circuit can also include a status sensor configured to output a first current if the seatbelt latch is in a removed state, output a second current if the seatbelt latch is in an inserted state and output a third current if the seatbelt latch has a fault. The seatbelt latch circuit communicates with a vehicle electrical system through only two conductors.

Another aspect of the present invention relates to a vehicle electrical system including a signal measurement system that provides a measured signal that varies based on a status of an associated seatbelt latch. The vehicle system can also include a comparator configured to provide a status signal that indicates whether the seatbelt latch is in a removed or an inserted state or if a circuit housed in the seatbelt latch has a fault. The vehicle electrical system and the circuit housed in the seatbelt latch communicate over only two conductors.

Yet another aspect of the present invention relates to a system including a seatbelt latch circuit. The seatbelt latch circuit can include an illumination source configured to illuminate a seatbelt latch in response to a signal. The seatbelt latch circuit can also include a status sensor configured to output a first current if the seatbelt latch is in a removed state, output a second current if the seatbelt latch is in an inserted state and output a third current if the seatbelt latch circuit has a fault. The system can also include a vehicle electrical system. The vehicle electrical system can include a signal measurement system configured to provide a measured signal that varies based on a current output by the status sensor. The vehicle electrical system can also include a comparator configured to provide a status signal that indicates whether the seatbelt latch is in the removed or inserted state or if the seatbelt latch circuit has a fault. The seatbelt latch circuit communicates with a vehicle electrical system with no more than two conductors.

DETAILED DESCRIPTION

Figure 1:
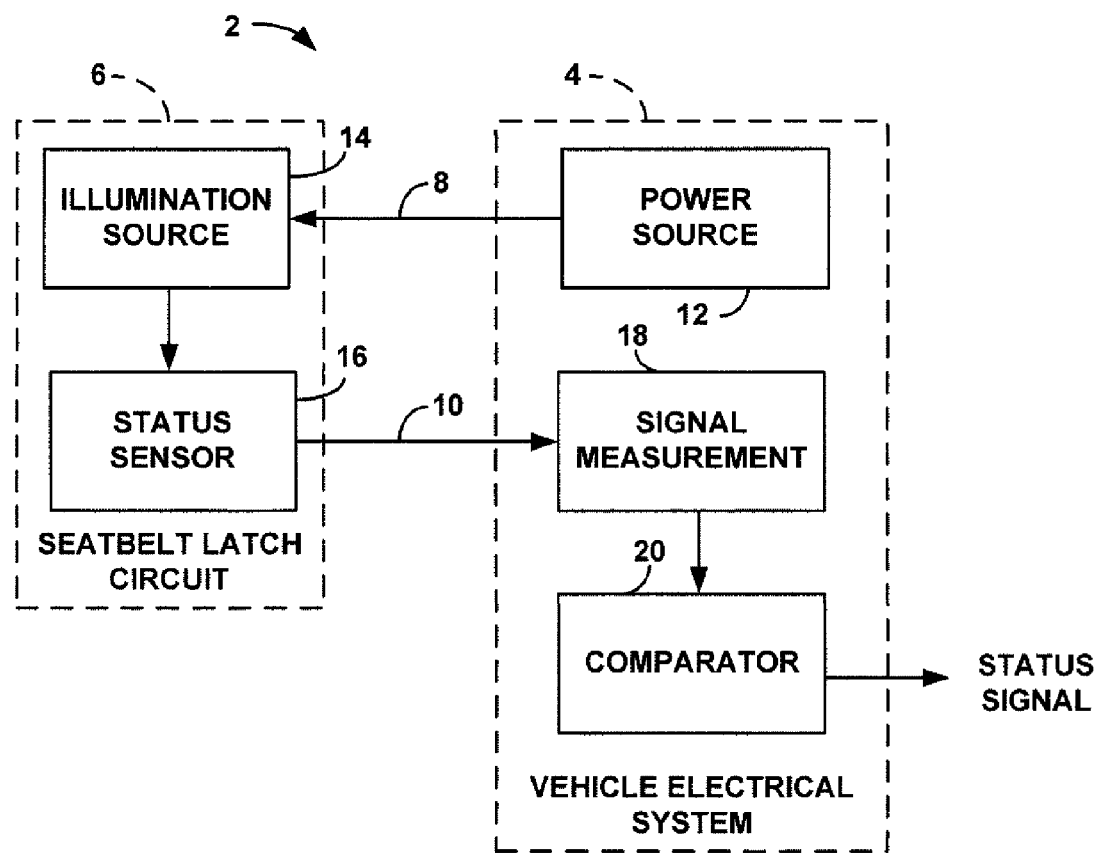
FIG. 1 illustrates an example of a system employed in a seatbelt system.

FIG. 1 illustrates an example of a system 2 that can be implemented in a seatbelt system. The system 2 can include a vehicle electrical system 4 that is electrically coupled to a seatbelt latch circuit 6 by only two conductors, namely a first conductor 8 and a second conductor 10. The seatbelt latch circuit 6 can be embedded in a seatbelt latch (e.g., a seatbelt buckle). The vehicle electrical system 4 can include a power source 12 that can be employed to drive an illumination source 14 of the seatbelt latch circuit 6 via the first conductor 8. In some examples, the power source 12 could be implemented, for example, as a regulated relatively constant voltage source (e.g., about 5 volts, 8 volts, or 12 volts). In other examples, the power source 12 could be an unregulated voltage source (e.g., about 5 to about 12 volts).

In some examples, the illumination source 14 of the seatbelt latch circuit 6 can include a light emitting diode (LED). The LED can be positioned within the seatbelt latch so as to illuminate the seatbelt latch to assist a user of the seatbelt system with an insertion and/or removal of a tongue from the seatbelt latch. In the present examples described herein, the term "removed state" of the seatbelt latch indicates that the tongue is removed from the seatbelt latch, such that the seatbelt latch is in an un-buckled state. Additionally, the term "inserted state" of the seatbelt latch indicates that the tongue is inserted into the seatbelt latch, such that the seatbelt latch is in a buckled state. In some examples, the illumination source 14 can include a resistor for controlling the current provided to the LED. In other examples, the illumination source 14 can include an incandescent bulb, a fluorescent lamp, etc.

The illumination source 14 can be communicatively coupled with a status sensor 16 of the seatbelt latch circuit 6. In some examples, the illumination source 14 can be connected in series to the status sensor 16, while in other examples, the illumination source 14 can be connected to the status sensor 16 in parallel. The status sensor 16 can include, for example, a Hall effect sensor or a switch. The status sensor 16 can also include a resistor. The status sensor 16 can output a current that is at a first level if the tongue is removed from the seatbelt latch and a current at a second level if the tongue is inserted into the seatbelt latch. In some examples, the first level can be higher than the second level, such that the illumination source 14 receives a higher amount of current when the tongue is removed from the seatbelt latch thereby causing the illumination source 14 to illuminate at a brighter level than at times when the tongue is inserted into the seatbelt latch. In other examples, the current provided through the illumination source 14 can be controlled by an external signal (e.g., an intensity control signal) and/or the second level can be higher than the first level.

Additionally, the status sensor 16 can output a third current if there is a fault within the status sensor 16 and/or the illumination source 14. For instance, as explained herein, the third current is different than the first and second currents, but in some examples the third current may be higher or lower than either the first or second currents. The fault could be, for example, a defective status sensor 16 (e.g., a defective Hall effect sensor), a defective illumination source 14 (e.g., a defective LED) a short circuit and/or an open circuit etc.

The status sensor 16 can provide the output signal to a signal measurement component 18 of the vehicle electrical system 4 via the second conductor 10. The signal measurement component 18 could be implemented on a controller. In some examples, the controller could be implemented as a microcontroller that can store machine-readable instructions in a memory and execute the machine-readable instructions with a processor. The signal measurement component 18 can determine a voltage level of the output signal. The signal measurement component 18 can provide data that characterizes the measured voltage level to a comparator 20 of the vehicle electrical system 4. The comparator 20 can be implemented, for example, as a component on the controller. The comparator 20 can compare the measured voltage level to a first level that is indicative of the tongue being in the inserted state (e.g., inserted into the seatbelt latch) and a second level indicative of the tongue being in the removed state (e.g., being removed from the seatbelt latch) to determine a state of the seatbelt latch. If the comparator 20 is unable to match the measured voltage level with the first or second levels, the comparator 20 can determine that the status sensor 16 has a fault. The comparator 20 can output a status signal that indicates whether (i) the seatbelt latch is in the inserted state, (ii) the seatbelt latch is in the removed state or (iii) the seatbelt latch circuit 6 has a fault.

By employment of the system 2, a standard seatbelt wiring harness for the seatbelt latch that has only two conductors (the first and second conductors 8 and 10) can be employed to house the seatbelt latch circuit 6. In this manner, no modifications would be necessary to such a wiring harness, while still providing for both an illumination of the seatbelt latch as well as the detection of a fault in the seatbelt latch circuit 6.

Figure 2:
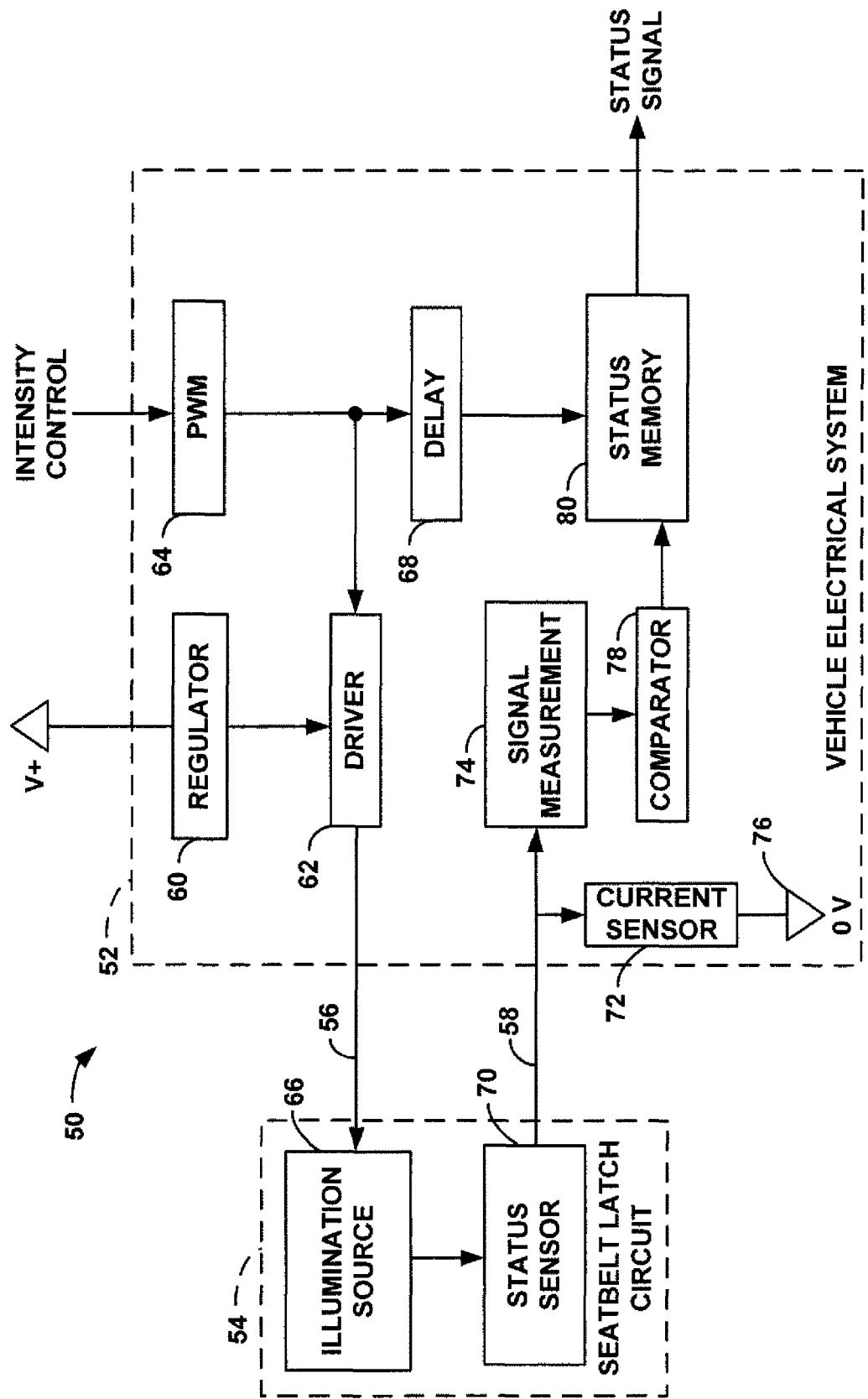
FIG. 2 illustrates another example of a system employed in a seatbelt system.

FIG. 2 illustrates a system 50 that can be employed in a seatbelt system. The system 50 can include a vehicle electrical system 52, which can be implemented, for example, as an integrated circuit (IC) chip and/or a printed circuit board with discrete circuit components that can be electrically coupled to a seatbelt latch circuit 54 housed in a seatbelt latch by only two conductors, namely, a first conductor 56 and a second conductor 58. The vehicle electrical system 52 can receive an input power signal at a regulator 60, such as a power signal from a battery and/or an alternator of a vehicle. In the present example, the various components of the vehicle electrical system 52 are illustrated as being separate components. In other examples, several (or all) of the circuit components can be integrated together onto a single IC chip, such as controller (e.g., a microcontroller), an application specific IC (ASIC) chip, etc.

The regulator 60 can be implemented, for example, as a voltage and/or a current regulator for regulating the voltage and/or the current of the input power signal. The regulator 60 can provide a relatively constant power signal to a driver 62, which could be implemented, for example, as an amplifier. The vehicle electrical system 52 can also receive an intensity control at a pulse generator and pulse width modulator component, which can be collectively referred to as a pulse width modulator (PWM) 64. The intensity control can be provided from an external circuit, such as a main controller for the vehicle. As explained herein, the intensity control can vary an illumination level of an illumination source 66 in the seat belt latch circuit 54. The illumination level can vary, for example, based on a state of the seatbelt latch (e.g., a removed or inserted state), a state of an associated seat (e.g., occupied or unoccupied), a motion state of the vehicle (e.g., moving or stationary), a user input, etc. Additionally, in some examples, the intensity control can cause the illumination source 66 to vary intensity over time, so as to provide a "buckle up" reminder to an occupant of the vehicle.

The PWM 64 can provide a pulse width modulated signal that varies as a function of the intensity control. For instance, in some examples, the pulse width modulated signal can have a frequency of about 30 hz to about 50 hz. Moreover, a duty cycle of the pulse width modulated signal can vary as a function of the intensity control. The pulse width modulated signal can be provided to the driver 62. The driver 62 can provide an amplified version of the pulse width modulated signal to the illumination source 66 within the seatbelt buckle via the first conductor 56 and to a delay 68. The illumination source 66 could be implemented, for example, as a LED and a resistor. In response, the LED can provide light pulses at a rate defined by the amplified pulse width modulated signal.

The illumination source 66 can be electrically connected to a status sensor 70. Although FIG. 2 illustrates the illumination source 66 and the status sensor 70 as being connected serially, in other examples, such as those described herein, the illumination source 66 and the status sensor 70 can be connected in parallel. The status sensor 70 can include a sensor (e.g., a Hall effect sensor or a switch) for detecting whether a tongue has been inserted into the seatbelt latch (e.g., the state of the seatbelt latch). Additionally, the status sensor 70 can include a resistor for regulating the current flowing through the seatbelt latch circuit 54.

The status sensor 70 can provide an output signal on at least one of the two conductors that connect the seatbelt latch circuit 54 and the vehicle electrical system 52. The output signal can have a first current if the seatbelt latch is in the removed state, a second current if the seatbelt latch is in the inserted state and a third current if the status sensor 70 and/or the illumination source 66 is experiencing a fault, such as a defective component, an open circuit and/or a short circuit.

A current sensor 72 and a signal measurement component 74 can receive the output signal from the seatbelt latch circuit 54. The current sensor 72 could be implemented, for example, as a current sensing resistor that is coupled to an electrically neutral point 76 (e.g., ground or chassis ground).

The signal measurement component 74 can measure a voltage drop across the current sensor 72. The signal measurement component 74 can provide a measured voltage level corresponding to the voltage drop across the current sensor 72 to a comparator 78. The comparator 78 can compare the measured voltage level with (i) a first predetermined voltage level indicative of the seatbelt latch being in the removed state and (ii) a second predetermined voltage level indicative of the seatbelt latch being in the inserted state. Additionally, if the measured voltage level does not match either the first or second predetermined voltage levels, the comparator 78 can determine that the status sensor 70 and/or the illumination source 66 has a fault. In this manner, the comparator 78 outputs a signal that can indicate the state of the seatbelt latch (e.g., the removed or inserted state) or if the seatbelt latch circuit 54 has a fault. The signal output by the comparator 78 can be provided to a status memory 80.

The status memory 80 can be implemented, for example, as random access memory that can store a value corresponding to the status of the seatbelt latch. The status memory 80 can receive the output signal from the comparator 78, as well as an output signal from the delay 68. The delay 68 can be implemented, for example, as a digital delay (e.g., a flip-flop or series of flip-flops) that can delay the pulse width modulated signal from the PWM 64 by about the same amount of time as a delay caused by the driver 62, the illumination source 66, the status sensor 70 the signal measurement component 74 and the comparator 78. In this manner, the output of the delay 68 and the output of the comparator 78 can arrive at the status memory 80 at approximately the same time. The output of the delay 68 can be implemented as a delayed pulse width modulated signal.

In response to receiving a pulse in the output signal of the delay 68, the status memory 80 can write a current value of the output of the comparator 78 into the status memory 80. The status memory 80 can output a status signal that is indicative of the most recent stored value for the output of the comparator 78. In this manner, the status signal can indicate the state of the seatbelt latch (e.g., the removed or inserted state) or if a fault in the seatbelt latch circuit 54 exists. By employment of the system 50, the vehicle electrical system 52 can illuminate the seat belt latch and monitor the status of the seatbelt latch circuit 54 while only communicating to the seat belt latch circuit with the first conductor 56 and the second conductor 58.

Figure 3:
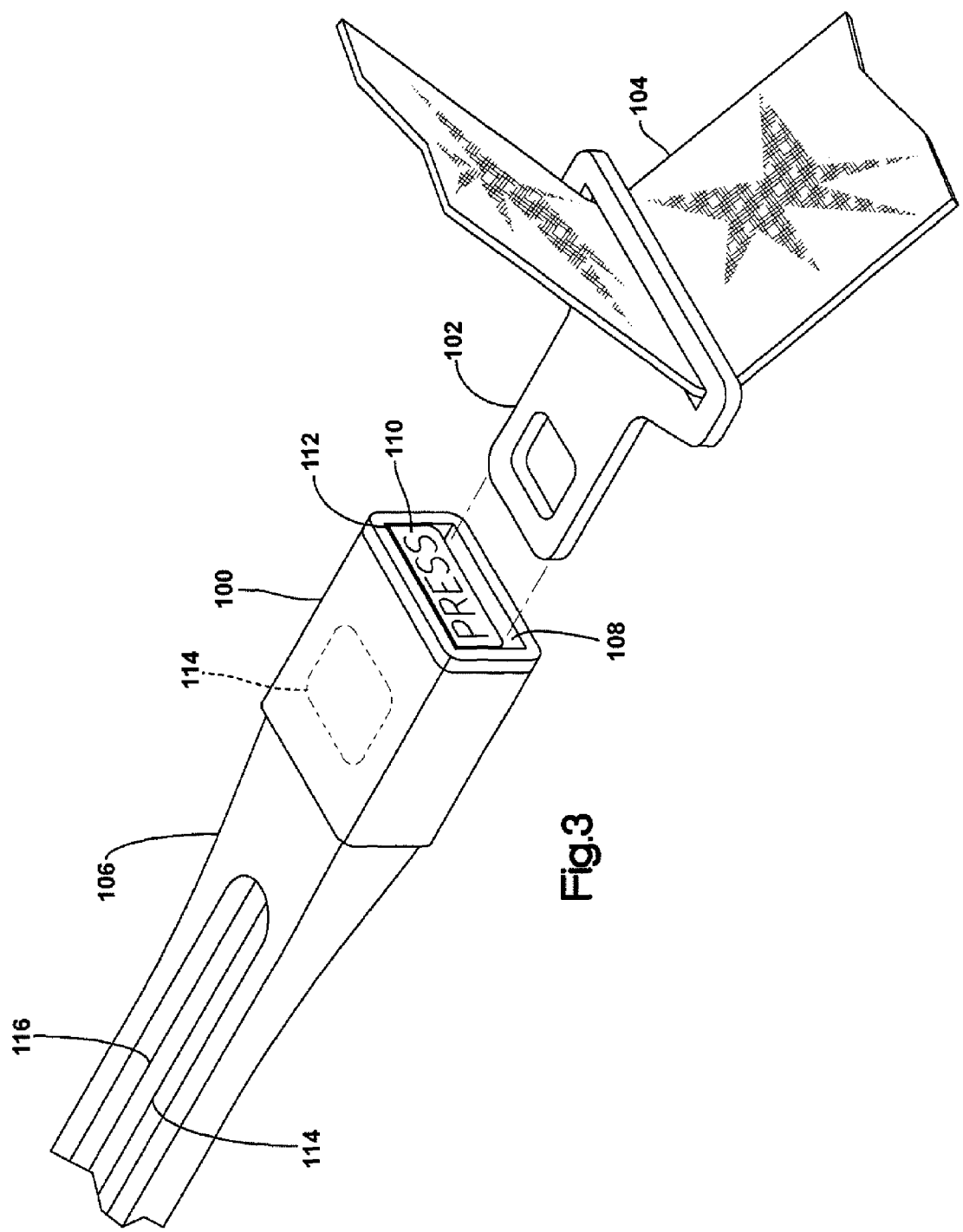
FIG. 3 illustrates an example of a schematic of a seatbelt latch and tongue.

FIG. 3 illustrates a schematic diagram of a seatbelt latch 100 and a tongue 102 that can be employed, for example to house the seatbelt latch circuit 6 and/or 54 illustrated in FIGS. 1 and 2. A seatbelt webbing 104 can be attached to the tongue 102. The seatbelt latch 100 can be anchored in a vehicle, such as by an anchor strap 106. A latching mechanism can lock the tongue 102 in the seatbelt latch when the tongue 102 is inserted through an opening 108 at the upper end of the seatbelt latch 100, thereby causing the seatbelt latch 100 to be in the inserted state. The tongue 102 can be subsequently removed from the seatbelt latch 100 upon depression of a pushbutton 110 adjacent to the opening 108, thereby causing the seatbelt latch 100 to be in the removed state. The seatbelt latch 100 can include a lighted portion 112 that circumscribes the pushbutton 110. The lighted portion 112 can be lit, for example, by an illumination source, such as the illumination source 14 and/or 66 illustrated in FIGS. 1 and 2.

Moreover, a seatbelt latch circuit 114 can be housed by the seatbelt latch 100. The seatbelt latch circuit 114 can include the illumination source and a status sensor (e.g., the status sensor 16 and/or 70 illustrated in FIGS. 1 and 2). The seatbelt latch circuit 114 can communicate with a vehicle electrical system (e.g., the vehicle electrical system 4 and/or 52 illustrated in FIGS. 1 and 2) via a first conductor 116 and a second conductor 118.

Figure 4:
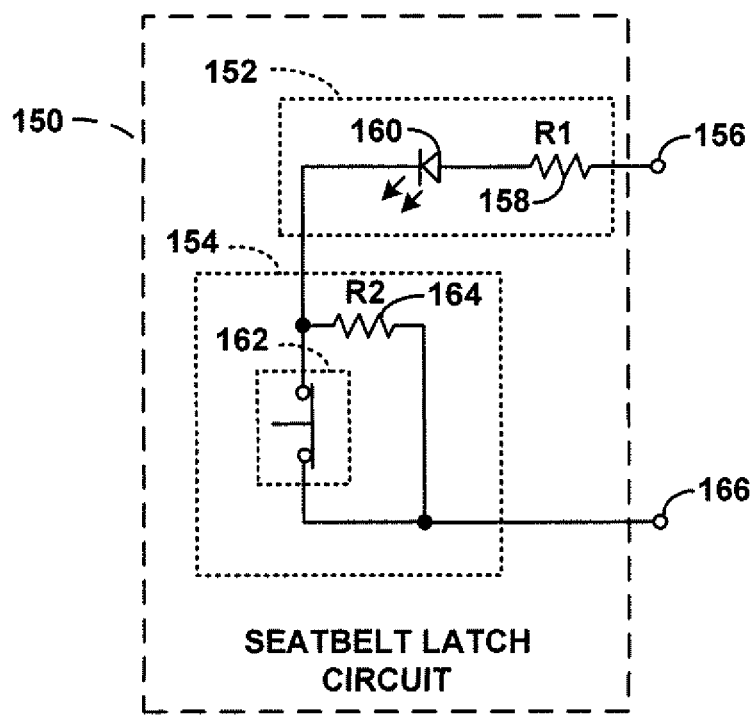
FIG. 4 illustrates an example of a seatbelt latch circuit.

FIG. 4 illustrates an example of a circuit 150 that could be employed as the seatbelt latch circuit 6 illustrated in FIG. 1 and/or the seatbelt latch circuit 54 illustrated in FIG. 2. The circuit 150 can be housed in a seatbelt latch. The circuit 150 can include an illumination source 152 connected in series with a status sensor 154. The circuit 150 can receive a pulse width modulated signal at a first terminal 156. In some examples, the pulse width modulated signal could be, for example, the amplified pulse width modulated signal provided by the driver 62 illustrated in FIG. 2. The illumination source 152 can include a resistor R1 158 coupled in series with an LED 160. The pulse width modulated signal causes the LED 160 to pulse light at a frequency and duration corresponding to the frequency and duty cycle of the pulse width modulated signal.

The output of the LED 160 can be provided to the status sensor 154. The status sensor 154 can include a switch 162 and a second resistor R2 164 that are connected in parallel. The switch 162 can be a normally closed switch, such that the switch 162 is closed when the seatbelt latch is in the removed state. Moreover, inserting the tongue into the seatbelt latch (e.g., causing the seatbelt latch to transition to the inserted state) can cause the switch 162 to open. Accordingly, in the present situation, the switch 162 shorts R2 164 when the seatbelt latch is in the removed state and conversely, current flows through R2 164 when the seatbelt latch is in the inserted state. In this manner, a higher current flows through the circuit 150 and out a second terminal 166 of the circuit 150 when the seatbelt latch is in the inserted state than when the seatbelt latch is in the removed state. Accordingly, the LED 160 will have a greater illumination (e.g., brighter) when the seatbelt latch is in the removed state than when the seatbelt latch is in the inserted state. Thus, as explained herein, a signal measurement and a comparator can determine a state of the seatbelt latch.

Additionally, in the event that the circuit 150 experiences a fault such as an open circuit that prevents current from flowing through the circuit, or a short circuit across the first and second terminals 156 and 166, the current through the circuit 150 will drop or raise to an unexpected level. Thus, as explained herein, a signal measurement and the comparator can determine that there is a fault within the circuit 150.

Figure 5:
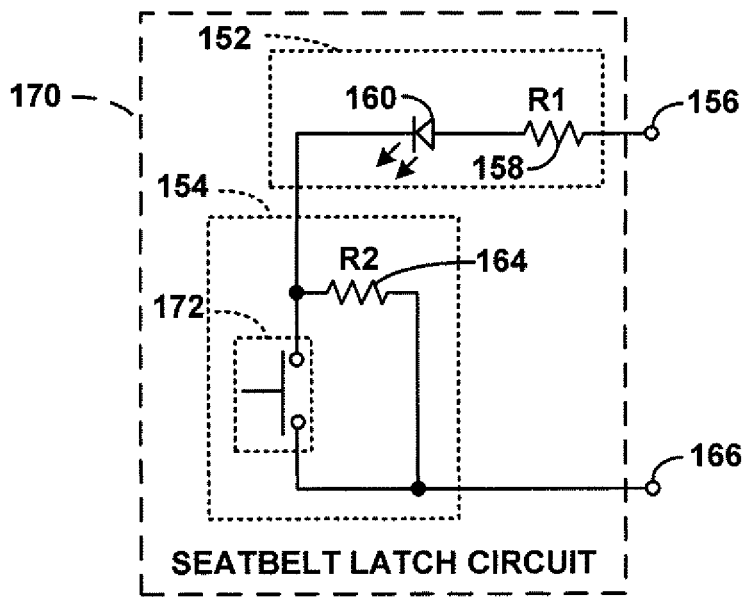
FIG. 5 illustrates another example of a seatbelt latch circuit.

FIG. 5 illustrates another example of a circuit 170 that could be employed as the seatbelt latch circuit 6 and/or 54 illustrated in FIGS. 1 and 2. For purposes of simplification of explanation, the same reference numbers are employed in FIGS. 4 and 5 to reference the same structure. Moreover, the circuit 170 illustrated in FIG. 5 is similar to the circuit 150 illustrated in FIG. 4, except that a normally open switch 172 is employed in place of the normally closed switch 162. In this manner, the normally open switch 172 is in an open state when the seatbelt latch is in the removed state and the normally open switch is closed when the seatbelt latch is in the inserted state.

In the circuit 170, a higher current flows through the circuit 170 when the seatbelt latch is in the inserted state than when the seatbelt latch is in the removed state. To compensate for this, an external circuit (e.g., a vehicle electrical system and/or a main controller) can increase a frequency and/or a duty cycle of a pulse width modulated signal provided at a first terminal 156 of the circuit 170 when it is detected that the seatbelt latch is in the removed state. Moreover, the external circuit could also be configured to decrease a frequency and/or a duty cycle of the pulse width modulated signal provided to the first terminal of the circuit 170 when it is detected that the seatbelt latch is in the inserted state. In this manner, the LED 160 can still provide a higher level of illumination when the seatbelt latch is in the removed state than when the seatbelt latch is in the inserted state.

Figure 6:
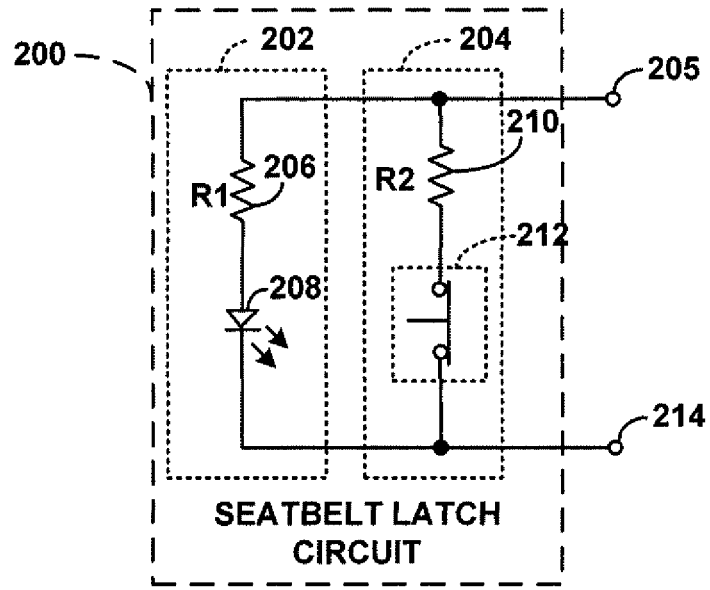
FIG. 6 illustrates yet another example of a seatbelt latch circuit.

FIG. 6 illustrates yet another example of a circuit 200 that could be employed in the seatbelt latch circuit 6 illustrated in FIG. 1 and/or the seatbelt latch circuit 54 illustrated in FIG. 2. The circuit can include an illumination source 202 and a status sensor 204 connected in parallel. The circuit 200 can receive a pulse width modulated signal at a first terminal 205. In some examples, the pulse width modulated signal could be, for example, the amplified pulse width modulated signal provided by the driver 62 illustrated in FIG. 2. The illumination source 202 can include a resistor R1 206 coupled in series with an LED 208. The pulse width modulated signal causes the LED 208 to pulse light at a frequency and duration corresponding to the frequency and duty cycle of the pulse width modulated signal.

Additionally, the status sensor 204 can include a second resistor, R2 210 connected in series with a normally closed switch 212. The normally closed switch 212 can be in a closed state when the seatbelt latch is in a removed state and the normally closed switch 212 can be in an opened state when the seatbelt latch is in the inserted state. In this manner, current flowing through out a second terminal 214 of the circuit 200 is higher (e.g., a first current) when the seatbelt latch is in the removed state than when the seatbelt latch is in the inserted state (e.g., a second current). Moreover, in a condition of a fault, such as an open or short circuit between the first and second terminals 205 and 214 of the circuit 200, the current flowing through the circuit 200 can change to a third (and unknown) current. Accordingly, a signal measurement a comparator can detect whether the seatbelt latch is in the removed state, the inserted state or whether the circuit 200 has a fault.

Moreover, since the illumination source 202 is coupled in parallel with the status sensor 204, the current through the LED 208 is independent of the state of the normally closed switch 212. Thus, upon detecting that the seatbelt latch is in the removed state, an external circuit (e.g., a vehicle electrical system and/or a main controller) can increase a frequency and/or a duty cycle of the pulse width modulated signal provided to the first terminal 205. Additionally, upon detecting that the seatbelt latch is in the inserted state, the external circuit can decrease the frequency and/or the duty cycle of the pulse width modulated signal provided to the first terminal 205.

Figure 7:
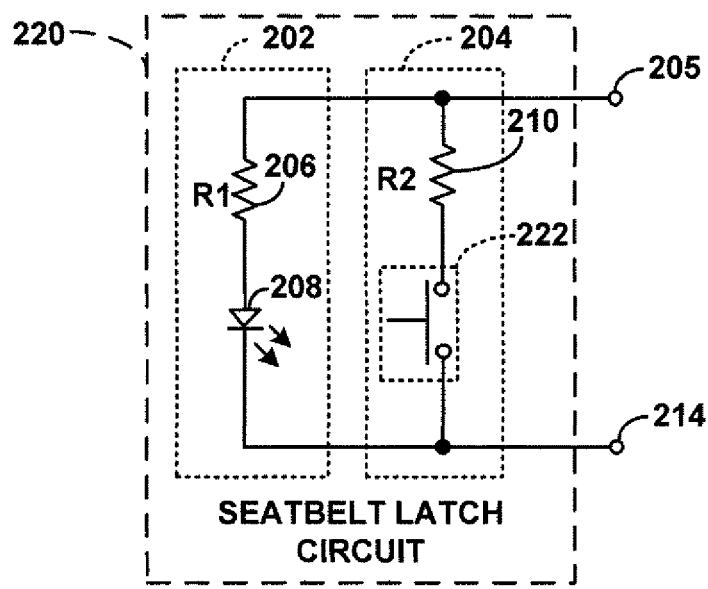
FIG. 7 illustrates still another example of a seatbelt latch circuit.

FIG. 7 illustrates still another example of a circuit 220 that could be employed as the seatbelt latch circuit 6 and/or 54 illustrated in FIGS. 1 and 2 that is housed in a seatbelt latch. For purposes of simplification of explanation, the same reference numbers are employed in FIGS. 6 and 7 to indicate the same structure. Moreover, the circuit 220 illustrated in FIG. 7 is similar to the circuit 200 illustrated in FIG. 6, except that a normally open switch 222 is employed in place of the normally closed switch 212. In the circuit 220, current output at a second terminal 214 of the circuit 220 is higher when the seatbelt latch is in the inserted state than when the seatbelt latch is in the removed state. Moreover, a signal measurement and a comparator can be employed to determine a state of the seatbelt latch, as well as determining if the circuit has a fault, in a manner described herein. Additionally, similar to FIG. 6 an external circuit (e.g., a vehicle electrical system and/or a main controller) can increase a frequency and/or a duty cycle of the pulse width modulated signal provided at a first terminal 205 of the circuit if the seatbelt latch is detected to be in the removed state. Further, the frequency and/or the duty cycle of the pulse width modulated signal can be decreased if the seatbelt latch is detected to be in the inserted state.

Figure 8:
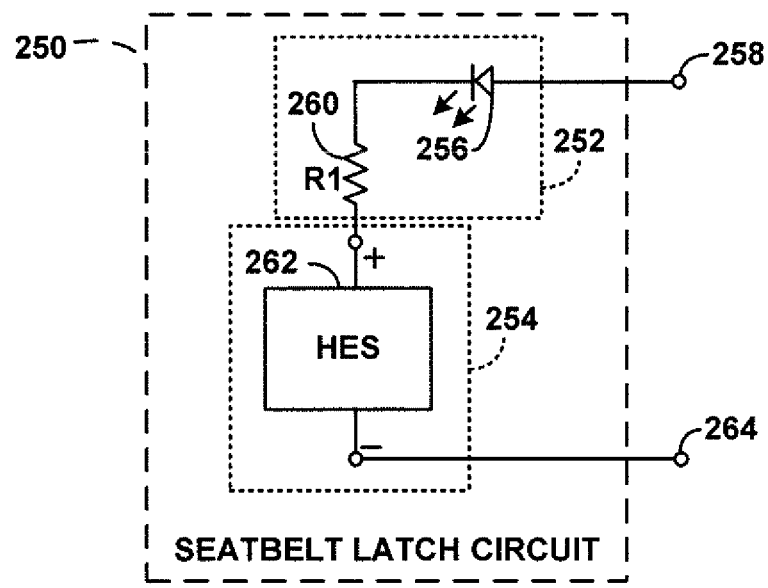
FIG. 8 illustrates still yet another example of a seatbelt latch circuit.

FIG. 8 illustrates still yet another example of a circuit 250 that could be employed as the seatbelt latch circuit 6 and/or 54 illustrated in FIGS. 1 and 2. The circuit 250 can be housed in a seatbelt latch. The circuit 250 can include an illumination source 252 connected in series with a status sensor 254. The illumination source 252 can receive a pulse width modulated signal at a first terminal 258 of the circuit 250. The illumination source 252 can include an LED 256 that can be coupled to the first terminal 258 of the circuit 250 and connected in series with a resistor R1 260. The LED 256 can pulse light at a frequency and duration defined by the frequency and duty cycle of the pulse width modulated signal.

The status sensor 254 can include a Hall effect sensor 262. The Hall effect sensor 262 can be implemented as a transducer that varies its output current in response to a magnetic field. The Hall effect sensor 262 can detect a presence or absence of a tongue at the seatbelt latch based on induced magnetic fields. Upon detecting that the seatbelt latch is in a removed state, the Hall effect sensor 262 can output a first current at a second terminal 264 of the circuit 250. Moreover, upon detecting that the seatbelt latch is in an inserted state, the Hall effect sensor 262 can output a second current at the circuit 250. In some examples, the first current can be higher than the second current, but is to be understood that in other examples, the second current can be higher than the first current. Additionally, in the event of a fault, such as a short circuit or open circuit at the Hall effect sensor 262, R1 260 and/or the LED 256, a third (and unknown) current can be output at the second terminal 264. In this manner, a signal measurement component and a comparator can determine a state of the seatbelt latch, in a manner described herein. Additionally, the signal measurement component and the comparator can determine if there is a fault in the circuit 250.

Figure 9:
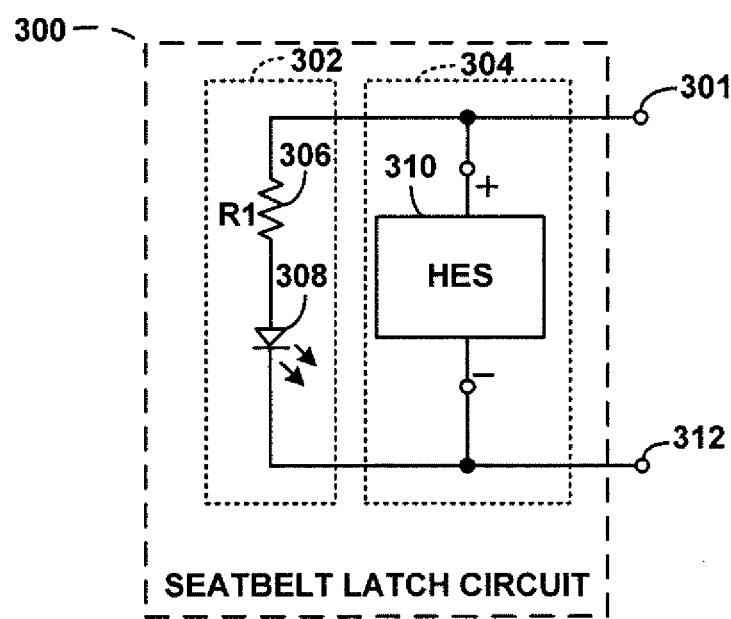
FIG. 9 illustrates further still another example of a seatbelt latch circuit.

FIG. 9 illustrates still another circuit 300 that could be implemented as the seatbelt latch circuit 6 and/or 54 illustrated in FIGS. 1 and 2 housed in a seatbelt latch. The circuit 300 can receive a pulse width modulated signal provided by a driver (e.g., the driver 62 illustrated in FIG. 2) at a first terminal 301. The circuit 300 can include an illumination source 302 connected in parallel with a status sensor 304. The illumination source 302 can include a resistor R1 306 connected in series with a LED 308. The LED 308 can pulse light with a frequency and duration corresponding to a frequency and duty cycle pulse width modulated signal.

The status sensor 304 can include a Hall effect sensor 310 that can detect a state of the seatbelt latch by detecting a presence or absence of a tongue inserted into the seatbelt latch. Upon detecting that the seatbelt latch is in a removed state, the Hall effect sensor 310 can output a first current at a second terminal 312 of the circuit 300. Moreover, upon detecting that the seatbelt latch is in an inserted state, the Hall effect sensor 310 can output a second current at the circuit 300. In some examples, the first current can be higher than the second current, but it is to be understood that in other examples, the second current can be higher than the first current. Additionally, in, the event of a fault, such as a short circuit or open circuit at the Hall effect sensor 310, R1 306 and/or the LED 308, a third (and unknown) current can be output at the second terminal 312. In this manner, a signal measurement component and a comparator can determine a state of the tongue with respect to the seatbelt latch, in a manner described herein. Accordingly, the signal measurement component and the comparator can determine if there is a fault in the circuit 300.

The current flowing through the LED 308 can be relatively constant and independent of a state of the seatbelt latch. Accordingly, an external circuit (e.g., a vehicle electrical system and/or a main controller), upon detecting a state of the seatbelt latch can increase a frequency and/or a duty cycle of the pulse width modulated signal in response to detecting that the seatbelt latch is in the removed state.

Similarly, the external circuit can also decrease the frequency and/or duty cycle of the pulse width modulated signal in response to detecting that the seatbelt latch is in the inserted state.

Figure 10:
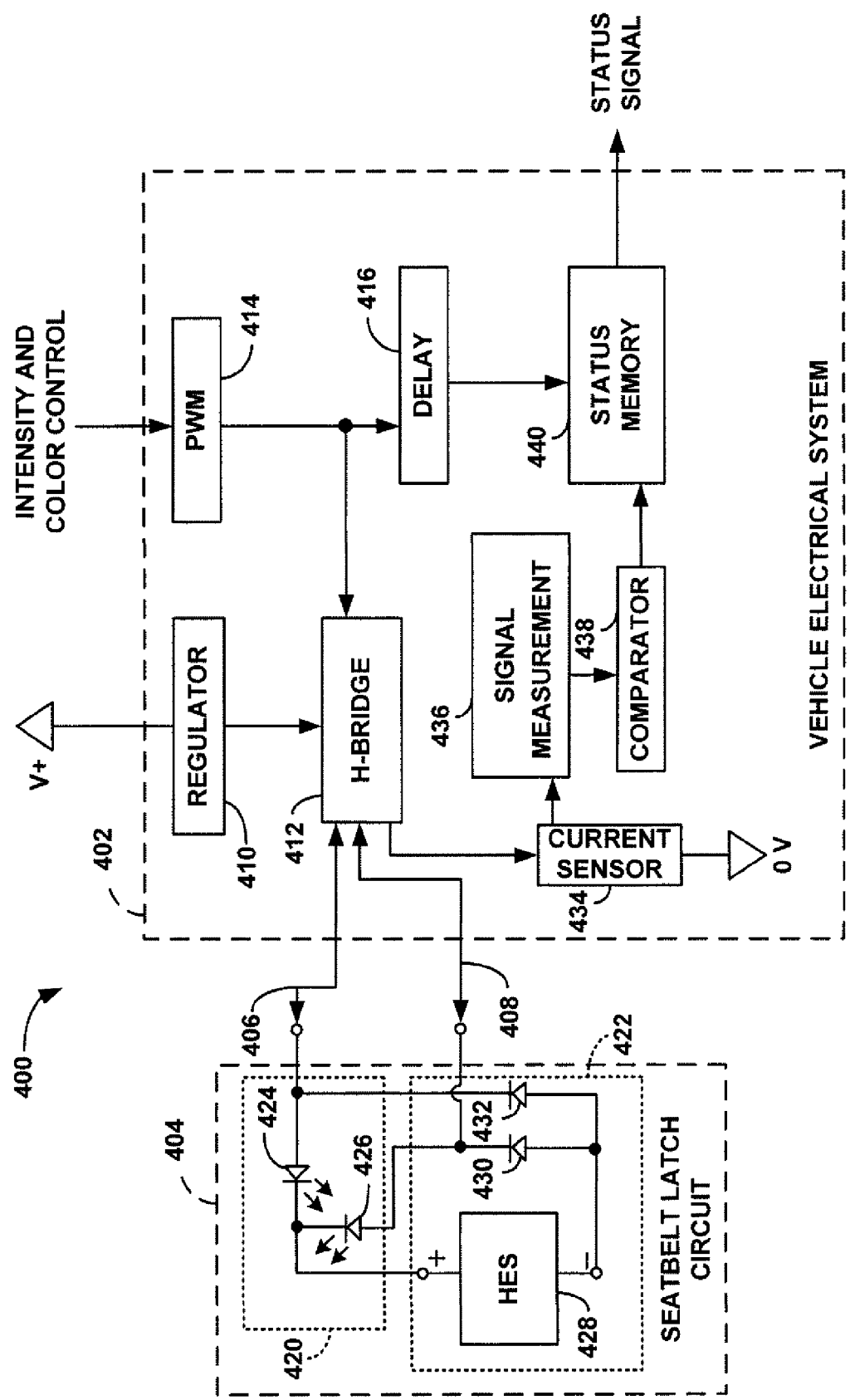
FIG. 10 illustrates yet another example of a system employed in a seatbelt system.

FIG. 10 illustrates still another example of a system 400 that can be employed in a seatbelt system. A vehicle electrical system 402, which can be implemented, for example, as an integrated circuit (IC) chip and/or a printed circuit board can be electrically coupled to a seatbelt latch circuit 404 by only two conductors, namely a first conductor 406 and a second conductor 408. Moreover, each of the components of the vehicle electrical system 402 can be implemented as discrete circuits, IC chips or a combination thereof. Further some (or all) of the components can be integrated together, for example on a controller, an ASIC, etc. In some examples, the controller could be implemented as a microcontroller that can store machine-readable instructions and a memory and execute the machine-readable instructions with a processor.

The vehicle electrical system 402 can receive an input power signal at a regulator 410, such as a power signal from a battery and/or an alternator of a vehicle. The regulator 410 can be implemented, for example, as a voltage and/or a current regulator for regulating the voltage and/or the current of the input power signal. The regulator 410 can provide a relatively constant power signal to an H-bridge 412. The vehicle electrical system 402 can also receive an intensity and color control signal at a pulse generator and pulse width modulator component, which can be collectively referred to as a pulse width modulator (PWM) 414. The intensity and color control can be implemented, for example, as a digital signal that identifies a specific intensity and color to output at the seatbelt latch.

The PWM 414 can provide a pulse width modulated signal that varies as a function of the intensity and color control. For instance, in some examples, pulse width modulated signal can have a frequency of about 30 hz to about 50 hz. Moreover, a duty cycle of the pulse width modulated signal can vary as a function of the color and intensity control. The pulse width modulated signal can be provided to the H-bridge 412 and a delay 416.

The H-bridge 412 can be implemented as a component that provides a bi-polar signal that enables a voltage to be applied across a load in either direction. The H-bridge 412 can provide a first drive signal to a first terminal of a seatbelt latch circuit 404 via the first conductor 406. Additionally, the H-bridge 412 can provide a second drive signal to a second terminal of the seatbelt latch circuit 404 via the second conductor 408. The first drive signal and the second drive signal can be bipolar signals that vary as a function of the pulse width modulated signal. Additionally, the first and drive second signals can be complements of each other.

The seatbelt latch circuit 404 can include an illumination source 420 connected with a status sensor 422. The illumination source 420 can include first and second LEDs 424 and 426, wherein each of the first and second LEDs 424 and 426 provide first and second colors. The status sensor 422 can include a Hall effect sensor 428 and first and second diodes 430 and 432.

In response to the H-bridge 412 providing the first drive signal at the first terminal of the seatbelt latch circuit 404 via the first conductor 406, the first LED 424 of the first color of the illumination source 420 rectifies the first drive signal and pulses light at a frequency corresponding to the frequency and duty cycle of the first drive signal. An output of the first LED 424 is input into the Hall effect sensor 428 of the status sensor 422. The current output at the Hall effect sensor 428 can vary as a function of a state of the seatbelt latch since the Hall effect sensor 428 can detect a presence or absence of a tongue being inserted into the seatbelt latch. For instance, if the seatbelt latch is in a removed state, the Hall effect sensor 428 can output a first current, and if the seatbelt latch is in the inserted state, the Hall effect sensor 428 can output a second current. Additionally, current from the Hall effect sensor 428 can flow through the first diode 430 and can be provided at the second terminal of the H-bridge 412 via the second conductor 408.

In response to the H-bridge 412 providing the second drive signal at the second terminal of the seatbelt latch circuit 404 via the second conductor 408, the second LED 426 of the second color in the illumination source 420 rectifies the second drive signal and pulses light at a frequency duration corresponding to the frequency and duty cycle of the second drive signal. An output of the second LED 426 is input into the Hall effect sensor 428. Additionally, current from the Hall effect sensor 428 of the status sensor 422 can flow through the second diode 432 of the status sensor 422 and be provided at the first terminal of the H-bridge 412 via the first conductor 406.

The frequency and duty cycle of the first and second drive signals can define a cumulative color output by the seatbelt latch circuit 404. For instance, if the first LED 424 is a red LED and the second LED 426 is a green LED, the cumulative color output at the seatbelt latch could be yellow or orange, depending on the proportion of time that the red LED is illuminating compared to the proportion of time the green LED is illuminating.

The H-bridge 412 can output a signal with a current that varies as a function of a received current from either the first terminal via the first conductor 406 or the second terminal via the second conductor 408. A current sensor 434 and a signal measurement component 436 can receive the output signal from the H-bridge 412. The current sensor 434 could be implemented, for example, as a current sensing resistor that is coupled to an electrically neutral point (e.g., ground or chassis ground).

The signal measurement component 436 can measure a voltage drop across the current sensor 434. The signal measurement component 436 can provide a measured voltage level corresponding to the voltage drop across the current sensor 434 to a comparator 438. The comparator 438 can compare the measured voltage level with a first predetermined voltage level indicative of the seatbelt latch being in the removed state and a second predetermined voltage level indicative of the seatbelt latch being in the inserted state. Additionally, if the measured voltage level does not match the first or second predetermined voltage levels, the comparator 438 can determine that the seatbelt latch circuit 404 has a fault. In this manner, the comparator 438 can output a signal that can indicate whether the seatbelt latch is in the removed or inserted state or if the seatbelt latch circuit 404 has a fault. The signal output by the comparator 438 can be provided to a status memory 440.

The status memory 440 can be implemented, for example, as random access memory that can store a value corresponding to the status of the seatbelt latch. The status memory 440 can receive the output signal from the comparator 438, as well as an output signal from the delay 416. The delay 416 can be implemented, for example, as a digital delay (e.g., a flip-flop or series of flip-flops) that can delay the pulse width modulated signal from the PWM 414 by about the same amount of time as a delay caused by the driver, the illumination source 420 and the seatbelt latch circuit 404. In this manner, the output of the delay 416 and the output of the comparator 438 can arrive at the status memory 440 at approximately the same time. The output of the delay 416 can be implemented as a delayed pulse width modulated signal.

In response to receiving a pulse in the output signal of the delay 416, the status memory 440 can write a current value of the output of the comparator 438 into the status memory 440. The status memory 440 can output a status signal that is indicative of the most recent stored value for the output of the comparator 438. In this manner, the status signal can indicate whether the seatbelt latch is in the inserted or removed state or if there is a fault in the seat belt latch circuit 404. By employment of the system 400, the vehicle electrical system 402 can illuminate the seat belt latch with multiple colors and monitor the status of the circuitry in the seat belt latch while only communicating to the seat belt latch through the first conductor 406 and the second conductor 408.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Having described the invention, the following is claimed:

1. A seatbelt latch circuit comprising:
   an illumination source configured to illuminate a seatbelt latch in response to a signal; and
   a status sensor configured to:
      output a first current if the seatbelt latch is in a removed state;
      output a second current if the seatbelt latch is in an inserted state; and
      output a third current if the seatbelt latch has a fault, wherein the first, second and third currents are each different currents;
   wherein the seatbelt latch circuit communicates with a vehicle electrical system through only two conductors.

2. The seatbelt latch circuit of claim 1, wherein the seatbelt latch circuit is housed in the seatbelt latch.

3. The seatbelt latch circuit of claim 2, wherein the illumination source is connected in series with the status sensor.

4. The seatbelt latch circuit of claim 3, wherein the illumination source comprises a light emitting diode (LED) connected in series with a resistor.

5. The seatbelt latch circuit of claim 3, wherein the status sensor comprises a Hall effect sensor configured to output a current that varies based on a presence or absence of a tongue inserted into the seatbelt latch.

6. The seatbelt latch circuit of claim 3, wherein the status sensor comprises one of a normally open and normally closed switch connected in parallel with a resistor, the switch being configured to change state based on a state of the seatbelt latch.

7. The seatbelt latch circuit of claim 2, wherein the illumination source is connected in parallel with the status sensor.

8. The seatbelt latch circuit of claim 7, wherein the illumination source comprises a light emitting diode (LED) connected in series with a resistor.

9. The seatbelt latch circuit of claim 7, wherein the status sensor comprises a hall effect sensor configured to output a current that varies based on a presence or absence of a tongue inserted into the seatbelt latch.

10. The seatbelt latch circuit of claim 7, wherein the status sensor comprises one of a normally open and normally closed switch connected in series with a resistor, the one of the normally open and normally closed switch being configured to change state based on a state of the seatbelt latch.

11. The seatbelt latch circuit of claim 2, wherein the illumination source comprises:
    a first light emitting diode (LED) of a first color; and
    a second LED of a second color, the second color being different that the first color.

12. The seatbelt latch circuit of claim 2, wherein the status sensor comprises:
    a Hall effect sensor configured to provide an output current that varies based on a presence or absence of a tongue being inserted in the seatbelt latch; and
    first and second diodes configured to receive the output current provided by the Hall effect sensor.

13. A vehicle electrical system comprising:
    an illumination source configured to illuminate an associated seatbelt latch in response to a signal;
    a signal measurement system configured to provide a measured signal that varies based on a status of the associated seatbelt latch;
    a comparator configured to provide a status signal that indicates whether the seatbelt latch is in a removed or an inserted state or if a circuit housed in the seatbelt latch and including the illumination source has a fault, wherein the vehicle electrical system and the circuit housed in the seatbelt latch communicate over exactly two conductors;
    a pulse width modulator (PWM) configured to provide a pulse width modulated signal that varies as a function of an intensity control; and
    a driver configured to provide an amplified version of the pulse width modulated signal to the illumination source of the seatbelt latch circuit via a first of the exactly two conductors.

14. The vehicle electrical system of claim 13, further comprising a current sensor configured to receive an output signal from a status sensor via a second of the exactly two conductors.

15. The vehicle electrical system of claim 13, wherein the pulse width modulated signal further varies as a function of color control.

16. A vehicle electrical system comprising:
    an illumination source configured to illuminate an associated seatbelt latch in response to a signal;
    a signal measurement system configured to provide a measured signal that varies based on a status of the associated seatbelt latch; and
    a comparator configured to provide a status signal that indicates whether the seatbelt latch is in a removed or an inserted state or if a circuit housed in the seatbelt latch and including the illumination source has a fault, wherein the vehicle electrical system and the circuit housed in the seatbelt latch communicate over exactly two conductors;
    a pulse width modulator (PWM) configured to provide a pulse width modulated signal that varies as a function of an intensity and color control;
    an H-bridge configured to provide a first driving signal to the illumination source of the seatbelt latch circuit via a first of the exactly two conductors and a second driving signal to the illumination source of the seatbelt latch circuit via a second of the exactly two conductors.

17. A system comprising:
a seatbelt latch circuit comprising:
an illumination source configured to illuminate a seatbelt latch in response to a signal; and
a status sensor configured to:
output a first current if the seatbelt latch is in a removed state;
output a second current if the seatbelt latch is in an inserted state; and
output a third current if the seatbelt latch circuit has a fault, wherein the first, second and third currents are each different currents; and
a vehicle electrical system comprising:
a signal measurement system configured to provide a measured signal that varies based on a current output by the status sensor; and
a comparator configured to provide a status signal that indicates whether the seatbelt latch is in the removed or inserted state or if the seatbelt latch circuit has a fault;
wherein the seatbelt latch circuit communicates with a vehicle electrical system with no more than two conductors.

18. The system of claim 17, wherein the illumination source is connected in series with the status sensor, the illumination source comprising a light emitting diode (LED) connected in series with a resistor; and
the status sensor comprising a Hall effect sensor configured to provide the first or second current based on a presence or absence of a tongue inserted into the seatbelt latch.

* * * * *